US008257470B2

United States Patent
Lee et al.

(10) Patent No.: US 8,257,470 B2
(45) Date of Patent: Sep. 4, 2012

(54) SYSTEM OF TREATING ODOR AND HAZARDOUS GAS WITH ROTARY REGENERATIVE HEAT EXCHANGER AND ITS APPARATUS

(75) Inventors: Hyun Jae Lee, Daejeon (KR); Myeong Soo Yoon, Daejeon (KR); Min Su Shin, Daejeon (KR); Won Moon Jeong, Chungcheongbuk-do (KR); Jeong Ki Min, Daejeon (KR)

(73) Assignee: Enbion Inc., Daejeon (KR)

( * ) Notice: Subject to any disclaimer, the term of this patent is extended or adjusted under 35 U.S.C. 154(b) by 713 days.

(21) Appl. No.: 11/886,797

(22) PCT Filed: Mar. 24, 2006

(86) PCT No.: PCT/KR2006/001083
§ 371 (c)(1),
(2), (4) Date: Jul. 22, 2009

(87) PCT Pub. No.: WO2006/101366
PCT Pub. Date: Sep. 28, 2006

(65) Prior Publication Data
US 2009/0282984 A1 Nov. 19, 2009

(30) Foreign Application Priority Data
Mar. 24, 2005 (KR) .................. 10-2005-0024411

(51) Int. Cl.
*B01D 53/06* (2006.01)
(52) U.S. Cl. .......... 96/125; 95/21; 95/106; 95/113; 95/121; 95/148; 95/115; 95/143; 95/135; 95/139; 96/126; 96/108; 96/134; 96/142; 96/143; 96/144; 96/150; 96/153; 422/121; 422/122

(58) Field of Classification Search ............. 95/21, 106, 95/113, 121, 148, 115, 143, 135, 139; 96/125, 96/126, 108, 134, 142, 143, 144, 150, 153; 422/121, 122
See application file for complete search history.

(56) References Cited

U.S. PATENT DOCUMENTS

| 4,542,782 | A |  | 9/1985 | Berner |  |
|---|---|---|---|---|---|
| 5,693,123 | A | * | 12/1997 | Klobucar | 96/125 |
| 8,052,783 | B2 | * | 11/2011 | Baker | 96/125 |
| 2004/0069144 | A1 | * | 4/2004 | Wegeng et al. | 95/106 |

(Continued)

FOREIGN PATENT DOCUMENTS

JP 2002085934 A 3/2002
(Continued)

*Primary Examiner* — Robert A Hopkins
*Assistant Examiner* — Minh-Chau Pham
(74) *Attorney, Agent, or Firm* — The Webb Law Firm

(57) ABSTRACT

Disclosed is a harmful material treatment system for recovering the energy and removing the harmful material in the process of treating the gas containing the harmful material generated in the multiplex utilization facility, in the display mall, in diverse manufacturing processes and in the vehicle painting process, more particularly, to a harmful material treatment system which can recover the energy contained in the air conditioning facility or in the exhaust gas of the process with an efficiency of more than 90%, for exhausting the inside air to the outside so as to treat the contaminating material such as odor and volatile organic chemicals, and to remove the harmful material with a removal efficiency of more than 90% by adsorbing and concentrating the harmful material with a rotary-type adsorbent.

15 Claims, 4 Drawing Sheets

U.S. PATENT DOCUMENTS

| | | | |
|---|---|---|---|
| 2009/0229461 A1* | 9/2009 | Jeng et al. | 95/121 |
| 2010/0050866 A1* | 3/2010 | Yu et al. | 95/21 |
| 2010/0180763 A1* | 7/2010 | Lee | 95/148 |
| 2011/0209613 A1* | 9/2011 | Jensen et al. | 95/113 |

FOREIGN PATENT DOCUMENTS

| | | | |
|---|---|---|---|
| JP | 2002186822 A | 7/2002 | |
| JP | 2002248317 A | 9/2002 | |
| JP | 2005152761 A | 6/2005 | |
| KR | 20020033353 A | 5/2002 | |

\* cited by examiner

SYSTEM OF TREATING ODOR AND HAZARDOUS GAS WITH ROTARY REGENERATIVE HEAT EXCHANGER AND ITS APPARATUS

TECHNICAL FIELD

The present invention relates to a harmful material treatment system for which recovers the energy and removes the harmful material in the process of treating gas containing the harmful material generated in the multiplex utilization facility, the display mall, diverse manufacturing processes and the vehicle painting process, more particularly, to a harmful material treatment system, which can recover the energy contained in the air conditioning facility or in the exhaust gas of the process with an efficiency of more than 90%, for exhausting the inside air to the outside so as to treat the contaminating material such as odor and volatile organic chemicals (VOCs), and simultaneously remove the harmful material with a high removal efficiency of more than 90% by adsorbing and concentrating the harmful material with a rotary-type adsorbent.

BACKGROUND ART

In general, a rotary-type heat exchanger is employed to perform the heat exchange in facilities requiring a large-sized air conditioning device, such as a multiplex utilization facility, a habitation facility, and an event mall, and the like. In such facilities, thermal energy contained in the air exhausted to the outside is transferred to thermal energy storing elements at one side of the rotary-type heat exchanger and recover it at the opposite side to thereby recover the thermal energy.

However, nowadays, recognition about the material causing the sick-house syndrome has been increased in the habitant and the multiplex utilization facilities, and there occurs a problem that harmful material generated from the manufacturing process of the factory has made the work environment badly off to thereby reduce the productivity, so that cleaner life environment and factory working environment are required.

However, according to the conventional rotary-type heat exchanger, it is possible to recover the energy, but it is impossible to treat the harmful material introduced from the outside and the harmful material exhausted to the outside. Whereas, with regard to the method for treating the harmful material exhausted to the outside from the building or the factory, there are several methods such as an adsorption treatment method using activated carbon, a direct combustion method for removing it through combustion, a heat accumulating combustion method, and a catalyst combustion method, and the like, and there are also several methods for treating it by using microbes, and the like.

However, according to such diverse methods, although it is possible to remove the harmful material to be exhausted, it is also impossible to recover the thermal energy contained in the gas exhausted from the inside to the outside, resulting in a loss in the thermal energy.

FIG. 1 is a view for showing a conventional rotary-type heat exchanger disclosed in the U.S. Pat. No. 4,542,782. Referring to FIG. 1, the air flow exhausted with high temperature is effected in such a manner that heat is accumulated at one side of the heat exchanger through the rotary-type heat exchanger, and then is moved to the other side of the heat exchanger while being rotated to perform the heat exchange with the gas introduced from the outside to thereby recover the thermal energy. However, for such a method, there is a problem that the harmful material contained in the exhausted air cannot be removed.

FIG. 2 is a view for showing another example of the conventional rotary-type heat exchanger disclosed in Korea Patent Laid-Open Publication No. 2002-0033353. In FIG. 2, there is shown a rotary-type heat exchanger with a cleaning sector, which can improve the cleanliness of the indoor air by purifying the air backward-flowed toward the inside among the exhausted air to make it flow into the indoor.

However, this type of the heat exchanger is to prevent the backward-flow of the air contained in the inside space of the medium of the heat exchanger in the process of the conversion of the heat exchanger from the exhaust region to the suction region, by providing the cleaning sector at a boundary region between the suction region and the exhaust region of the heat exchanger for making a portion of the exhausted air purified and flowing into the suction region.

In this regard, there is no element for adsorbing the harmful material in the heat exchanger. Further, with regard to the cleaning method, it is constructed that the air received in the heat exchanger can be naturally exhausted by means of the pressure differential by closing one side of the cleaning sector and fluidically communicating the other side with the flow passage toward the exhaust fan.

However, with regard to this structure, there is also produced a problem that it is impossible to treat the harmful material exhausted to the outside and several contaminating material contained in the outside air flowing into the inside.

DISCLOSURE

Technical Problem

Therefore, the present invention has been made to solve the problems occurring in the conventional arts, and the primary object of the present invention is to provide a harmful material treatment system, which can adsorb and treat the harmful material exhausted from the inside to the outside or from the outside to the inside of the heat exchanger separately or treat them by means of a catalyst directly, not to mention the heat exchange, by making the rotating heat exchanger from material with adsorption and catalyst property for removing the harmful material and with high thermal energy storage and heat exchange capacities.

Another object of the present invention is to provide a harmful material treating system, which can accomplish the heat recovery of more than 90% of the exhausted energy and concurrently removing the harmful material with a removal percentage of more than 90% by using one treating system.

Still another object of the present invention is to provide a harmful material treatment system, which can adsorb and treat the harmful material by providing additionally the heat exchange function to an exhaust source incapable of adsorbing the harmful material due to the high temperature of the exhaust gas from the exhaust source.

Technical Solution

To solve such objects of the present invention, according to the present invention, there is provided a harmful material treatment system, which is configured to store and recover thermal energy, comprising a rotary-type rotor with a heat exchange medium having functions of adsorbing the harmful material and storing the thermal energy concurrently, and a heat exchange medium-receiving portion for supporting and rotating the heat exchange medium, the heat exchange medium being divided into three regions such as a suction region into which the air is sucked, an exhaust region from which the air is exhausted, and a concentration and desorption region disposed between the suction region and the exhaust region for concentrating and removing the harmful material; and driving means for rotating the rotary-type rotor.

Also, to attain the technical subject of the present invention, there is provided a harmful material treatment system, which is configured to regenerate thermal energy, comprising a heat exchange medium portion with a heat exchange medium having functions of adsorbing the harmful material and storing the thermal energy concurrently, and a heat exchange medium-receiving portion for supporting the heat exchange medium, the heat exchange medium being divided into at least three regions consisted of a suction region into which the air is sucked, an exhaust region from which the air is exhausted, and a concentration and desorption region disposed between the suction region and the exhaust region for concentrating and removing odor, volatile organic chemicals, or the harmful material; and rotatable distribution plates with a plurality of openings mounted respectively at the heat exchange medium portion, so that respective regions of the heat exchange medium defines separate flow passages to allow the inflow of the outside air and outflow of the inside air.

In addition, the present invention may further comprise heating means for heating the desorption air flowing into the concentration and desorption region.

Also, the desorption of the harmful material in the concentration and desorption region of the rotary-type rotor is carried out by the radiation of ultra-violet rays, by means of a sound wave or pressure reduced air.

In the present invention, the rotary-type rotor may further comprise a cooling region disposed between the concentration and desorption region and the suction region for cooling the heat exchange medium heated for desorption. In this instance, the outflow air exhausted from the cooling region is preferable to flow into the concentration and desorption region.

In the present invention, the heat exchange medium may use any one material selected from the group consisting of cordierite having a high thermal energy storage function, bending-type ceramic sheet, alumina, silica, polymer resin, aluminum, stainless, asbestos, and natural fiber, or a composite material made by combining such materials, as a thermal energy storage material, and can be made by performing coating of any one material selected from the group consisting of zeolite, activated charcoal, activated carbon fiber, alumina, silica, photo-catalyst, and low-temperature oxidation catalyst, or a composite material made by combining such materials on the thermal energy storage material, or is made by mixing such materials, and wherein the heat exchange medium may be made of at least one material selected from the group consisting of zeolite with a high thermal energy storage property, activated charcoal, activated carbon fiber, alumina, and silica.

In the present invention, the heat exchange medium comprises a thermal energy storage layer and an adsorption layer, and the thermal energy storage layer may be made of any one material selected from the group consisting of cordierite having a high thermal energy storing function, bending-type ceramic sheet, alumina, silica, polymer resin, aluminum, stainless, asbestos, and natural fiber, or a composite material made by combining such materials, and the adsorption layer may be made of any one material selected from the group consisting of zeolite, activated charcoal, activated carbon fiber, alumina, silica, photo-catalyst, and low-temperature oxidation catalyst, or a composite material made by combining such materials.

In the present invention, the treating system may further comprise an inside conduit portion having a plurality of separation plates closely contacting with the heat exchange medium at one side of the heat exchange medium, and forming separate flow passages at the heat exchange medium to correspond to said at least three regions, and a plurality of conduits for allowing the inflow and outflow of the air through the flow passages formed by the separation plates; and an outside conduit portion having a plurality of separation plates closely contacting with the heat exchange medium at the other side of the heat exchange medium, and forming separate flow passages fluidically to communicate with the inside conduit portion to correspond to the at least three regions of the heat exchange medium, and a plurality of conduits for allowing the inflow and outflow of the air through the formed flow passages.

Advantageous Effects

As described above, according to the present invention, it is possible to accomplish the thermal energy recovery percentage and recovery percentage of harmful material of more than 90% with using one system by removing the harmful material discharged from several discharge sources and concurrently treating the thermal energy discharged to the outside with the exhaust gas. Furthermore, when the zeolite is used as the adsorbent, it is possible to perform the action of removing the water component and concurrently enriching the oxygen in the air introduced from the outside.

BEST MODE

Hereinafter, most preferable embodiment of the present invention will be explained in detail with reference to the appended drawings.

In the specification explained hereinafter, the term of 'heat exchange medium' is used to represent that it performs not only the heat exchange simply, but it performs the adsorption of the harmful material concurrently. In the present invention, the term of 'thermal energy storage' is used in place of the term of 'heat exchange medium' for the medium designed to perform the heat exchange only.

Figure 1:
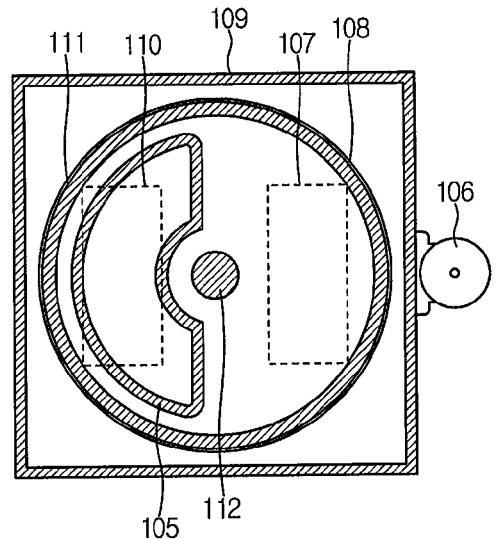
FIG. 1 is a view showing a structure of a conventional rotary-type heat exchange device.
Figure 2:
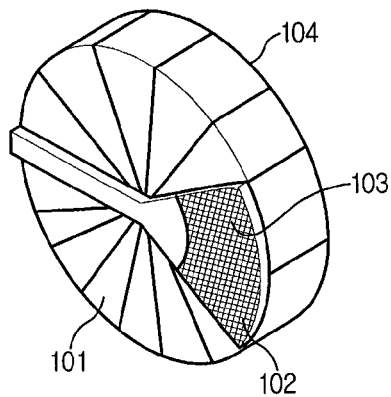
FIG. 2 is a view showing another conventional rotary-type heat exchange device.
Figure 3:
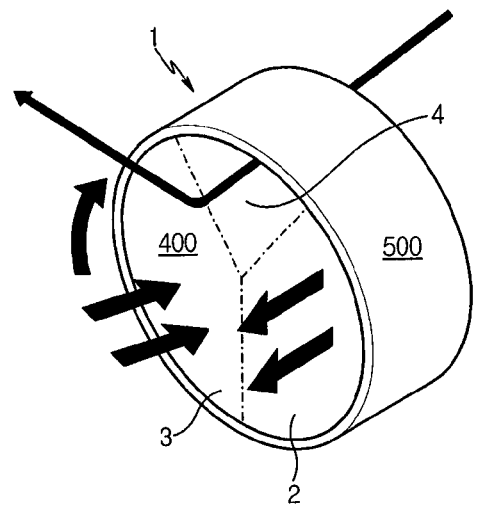
FIG. 3 is a basic conceptual view of a harmful material treatment system, which is configured to regenerate thermal energy by using a rotor, according to a preferred embodiment of the present invention.

FIG. 3 is a basic conceptual view showing a harmful material treatment system, which is configured to store and recover the thermal energy by using a rotor, according to a preferred embodiment of the present invention. In FIG. 3, a rotary-type rotor 1 of the present invention comprises a heat exchange medium 400 and a receiving portion 500 for the heating exchange medium for supporting it.

A region in which the heat exchange medium 400 exists is divided into a suction region 2, an exhaust region 3, and a concentration and desorption region 4. The heat exchange medium contains adsorption material for removing the harmful material by means of adsorption or reaction, and is comprised of thermal energy storage material with high thermal energy storage amount.

In the present invention, a specified portion of the heat exchange medium 400 is transported to the suction region 2, the concentration and desorption region 4, and the exhaust region 3 in order sequentially by means of the rotation of the rotary-type rotor 1.

For convenience's sake in representing, a rotation shaft of the rotary-type rotor 1 is not shown, and it will be the same in the other embodiments to be described below. The outside air, which has been flown into the suction region 2 according to the rotation of the heat exchange medium 400, recovers the thermal energy stored in the exhaust region 3 with an efficiency of more than 90%, and the harmful material adsorbed by the heat exchange medium in the exhaust region 3 is detached in the concentration and desorption region 4, so that it is possible to treat the harmful material economically by treating the harmful material with enriching more than one times the existing concentration.

As for an adsorption material for adsorbing and treating the harmful material in the present invention, one kind of material selected from the group consisting of is zeolite, activated charcoal, activated carbon fiber, alumina, silica, photo-catalyst, and low-temperature oxidation catalyst, and a composite material made by combining at least two kinds selected from the group can be used.

Furthermore, with regard to the thermal energy storage material, one kind of material selected from the group consisted of ceramic material such as cordierite, bending-type ceramic sheet, alumina, silica, and the like, polymer resin (urethane resin, polyethylene resin, polypropylene resin, and the like), aluminum, stainless, activated charcoal, natural fiber (palm fiber, pine fiber, hinoki-fiber, wool, cotton, ski-fiber, momi-fiber, buna-fiber, elm-like tree fiber), and asbestos, or a composite material made by combining such material selected from the group can be used.

The structure of the heat exchange medium 400 is a low-pressure loss type structure of honeycomb type, bending-type, or a net shape structure, or it can be used with forming the material into predetermined shape and then filling it.

The rotation direction of the rotor is as denoted by the arrow, so that the heat exchange medium 400 of the exhaust region 3 is converted sequentially into the exhaust region 3→concentration and desorption region 4→suction region 2→exhaust region 3, according to the rotation of the rotor, so that heat exchange function and the harmful material removing function can be performed.

When the temperature of the air exhausted from the inside is high, the thermal energy contained in the gas exhausted from the inside is derived by the heat exchange medium 400 in the exhaust region 3, and the harmful material is adsorbed by the heat exchange medium 400, so that the purified gas can be exhausted to the outside.

In this instance, the heat exchange medium 400 storing the thermal energy and adsorbing the harmful material in the exhaust region 3 is transported to the concentration and desorption region 4. Then, the transported heat exchange medium 400 is detached in the concentration and desorption region 4 by using temperature, pressure, photo energy, or sound wave energy, and is transported through a separate routine to thereby be exhausted to the outside by means of separate treating means, which can treat the harmful material.

In this instance, the gas purified by the treating means can be re-circulated into the exhaust region 3. Also, the volume of the air flowing into the concentration and desorption region 4 for the desorption is smaller than that of the air passing through the exhaust region 3, and it is desirable, so far as the volume of the air becomes smaller. In general, it is preferable to be ⅕ to 1/20. In this instance, it is necessary to cope with the desorption time and method properly so that there can be no energy loss stored in the heat exchange medium 400 during the desorption.

If the desorption time is too long, or if too high temperature is required for the desorption, energy loss can be occurred. Thus, the heat exchange medium 400 removed of the harmful material in the concentration and desorption region 4 is transported to the suction region 4 again, and it emits the energy stored in the rotary-type rotor 1 to transfer it to the air to be sucked. Also, the harmful material contained in the sucked air are adsorbed by a surface of the rotary-type rotor 1, resulting in the removal of them.

The heat exchange medium 400 passing through such processes is transported to the exhaust region 3 at last, and such process continues as long as the system is operated. If the treating system of the present invention is employed, it is possible to obtain the high heat recovery percentage of more than 90% and the harmful material removal percentage of more than 90% of the conventional thermal energy storage type heat exchanger.

Mode for Invention

Figure 4:
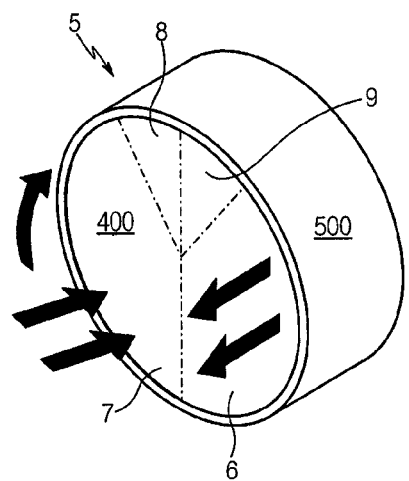
FIG. 4 is a basic conceptual view of a harmful material treatment system, which is configured to regenerate thermal energy by using a rotor, according to another embodiment of the present invention.

FIG. 4 is a basic conceptual view showing another example of a harmful material treatment system, which is configured to store and recover the thermal energy by using a rotor, according to the present invention. In the present example, a cooling region 9 is further formed between the concentration and desorption region 8 and the suction region 6. According to this embodiment, when the concentration and desorption process is to be performed to remove the harmful material adsorbed at the concentration and desorption region 8 by using the thermal energy, the thermal energy added for performing the desorption is recovered to be flowing into the inside progressively.

In this instance, the cooling region 9 is formed to reduce the amount of the thermal energy flowing into the inside, and the temperature of the rotary-type rotor 5 is maintained to be low in the suction region 6, so that it is possible to better adsorb and treat the contaminating material flowed in from the outside to the inside.

Figure 5:
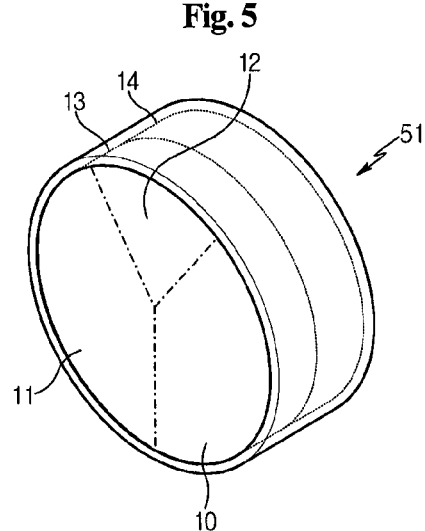
FIG. 5 is a basic conceptual view of a harmful material treatment system, which is configured to regenerate thermal energy by using a rotor, according to still another embodiment of the present invention.

FIG. 5 is a view showing another embodiment of the harmful material treatment system, which is configured to store and recover the thermal energy by using a rotor, according to the present invention.

In FIG. 5, it is constructed that the heat exchange medium is divided into a thermal energy storage medium 13 with which the heat exchange medium performs the function of heat exchange, and an adsorption medium 14 with which the heat exchange medium performs the function of removing the harmful material.

Such structure can be applied to a case in which it is difficult to adsorb the harmful material because the temperature of the gas exhausted from the inside to the outside is high. The exhaust gas with high temperature can perform the function of heat exchange in the thermal energy storage medium 13 for performing the heat exchange, and is flowing into the adsorption medium 14 at low temperature to remove the harmful material easily.

With regard to the physical adsorption property of the adsorbent, the adsorption is well performed at the low temperature and is not performed well at the high temperature. In general, it is preferable to set the adsorption temperature of the zeolite, and the activated charcoal to be below 50° C.

However, the rotary-type rotor 51 of the present invention can be used with combining the thermal energy storage medium 13 with the adsorption medium 14 in serious, or with adding or coating the adsorption medium 14 on the surface of the thermal energy storage medium.

Furthermore, it is possible to change the arranging order of the adsorption medium and the thermal energy storage medium, and to arrange them with more than one pair. In other words, it can be constructed in the order of "thermal energy storage medium—adsorption medium—thermal energy storage medium", or "adsorption medium—thermal energy storage medium—adsorption medium". Also, the rotor can be constructed of more than two sets of the combination described above.

Figure 6:
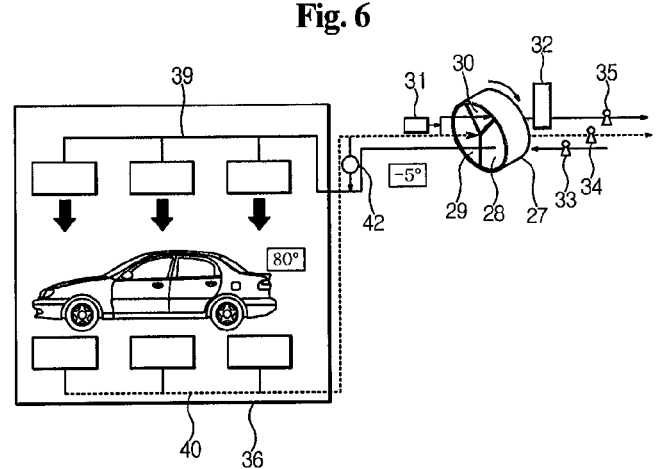
FIG. 6 is a use conceptual view of the harmful material treatment system of the present invention, which is configured to regenerate thermal energy by using a rotor.

FIG. 6 is an example of an embodiment according to the present invention, in which the energy is recovered and the indoor air is purified in the multiplex using facility such as a large display mall. The air exhausted from the large display mall 26 is flowing into the exhaust region 17 through an exhaust line 37. Depending on the circumstances, a portion of the gas exhausted through circulation air conditioning means 41 is made to circulate again.

By means of the gas flowing into the exhaust region 17, the harmful material produced in the display mall 26 is adsorbed on the surface of the rotary-type rotor 15 located at the exhaust region 17, and the energy exhausted from the indoor to the outside is transferred to the rotary-type rotor 15.

Then, the rotary-type rotor 15 is rotated to progress into the concentration and desorption region 20. In this instance, additional energy is applied to remove the harmful material attached on the surface of the rotary-type rotor 15 located in the concentration and desorption region 20, the energy being detached by desorption means 21.

With regard to the desorption energy added at this stage, desorption means 21 using the temperature, the pressure, and the combination of them can be used. In general, a detaching method using the thermal energy produced by increasing the temperature is employed.

Furthermore, photo energy (UV), and microwave can be used as desorption methods. Thus, the detached gas can be treated by means of removing means 22 for the harmful material. With regard to the removing means 22 for the harmful material, an adsorption method using a general adsorbent, an adsorption method using adsorbents, a combustion system using combustion (direct combustion, catalyst combustion, thermal energy storage combustion, thermal energy storage and catalyst combustion, concentration combustion), a biological treating method employing microbes can be used.

Also, a photo-catalytic device and a low-temperature oxidation catalytic device can be used, when the concentration of the exhaust gas is low. When the photo-catalytic device or the low-temperature oxidation catalytic device are to be used, the rotary-type rotor can be used by coating the surface thereof with the photo-catalyst and the low-temperature oxidation catalyst, after removing the removing means 22 for the harmful material.

The purified gas decomposed by the removing means 22 for the harmful material is exhausted to the outside through a blower 25. The rotary-type rotor 15, which has removed the harmful material at the concentration and desorption region 20, is transported to the suction region 16 with retaining the thermal energy only. The transported rotary-type rotor 15 heats the outside air flowed in by a suction fan 23 to a predetermined temperature and make it flow into the inside of the display mall 26.

In this instance, the rotation speed of the rotating rotary-type rotor 15 is preferable to be under three revolutions per minute in consideration of the durability of the device, although it is preferable so long as it is fast.

Figure 7:
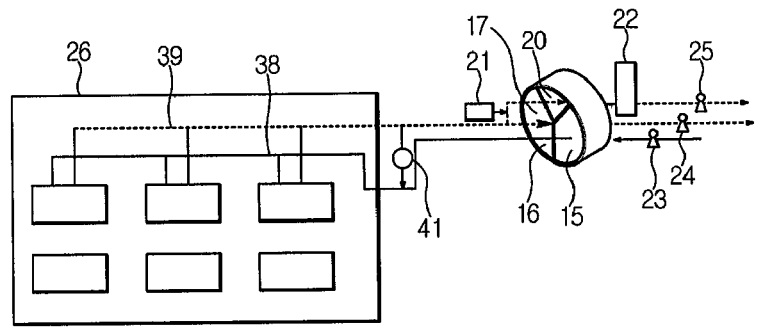
FIG. 7 is a use conceptual view of another example of the harmful material treatment system of the present invention, which is configured to regenerate thermal energy by using a rotor.

FIG. 7 shows another embodiment of the present invention, in which the present invention is applied to a vehicle painting process, and the like.

In such a case, the gas containing volatile organic chemicals produced in the painting process is exhausted at a high temperature above 80° C. If the temperature of the exhausted gas is so high, the removing percentage decreases rapidly because the harmful material such as the volatile organic chemicals contained in the exhaust gas is not well adsorbed to the adsorbent such as zeolite, or the activated charcoal, and the like.

In such a case, if the system suggested by the present invention is applied, it is possible to operate the removing means 22 for the harmful material by means of the combustion heat of the harmful material exhausted by adsorbing and concentrating the harmful material with the rotary-type adsorbent together with recovering the thermal energy of high temperature. It can be explained as follows more concretely.

The harmful material produced from the painting process 36 is exhausted to the outside through the exhaust line 40. The exhaust gas is at first flowing into the exhaust region 29, and then the heat exchange and the adsorption of the harmful material are performed concurrently, and is exhausted to the outside through the exhaust fan 34. In this regard, the heat exchange is carried out at the front of the rotary-type rotor 27, and the adsorption of the harmful material is carried out at the back thereof. Accordingly, the rotary-type rotor can be constructed of material for performing the heat exchange principally at the front portion thereof and material for performing the adsorption at the back portion thereof in principal. The rotary-type rotor 27, which has carried out the heat exchange and adsorption in the exhaust region 29, is transported to the concentration and desorption region 30, in which the temperature is increased by means of a detachable burner 31 using a portion of the exhaust gas to thereby remove the harmful material in the rotary-type rotor 27 using the thermal energy. The rotary-type rotor 27, which has removed the harmful material in the concentration and desorption region, is moved to the suction region 28 to thereby transfer the heat to the outside air flowed in by the suction fan 33 to heat the sucked air, and is moved to the inside of the painting process.

Figure 8:
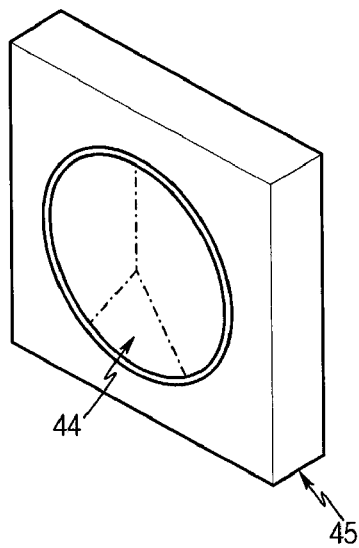
FIG. 8 is a view showing a harmful material treatment system, which is configured to regenerate thermal energy by using a rotor, according to a preferred embodiment of the present invention.

FIG. 8 is a conceptual view showing the system using the rotary-type rotor according to the present invention. The system comprises a rotary-type rotor 44 and a casing 45 for receiving it. The system employs a system, in which the casing 45 is fixed and the rotary-type rotor 44 is rotated to thereby convert the air flow path. While a rotation shaft and driving means for rotating the rotary-type rotor 44 are not shown separately, it can be easily designed by referring to FIG. 10 to be described below by those skilled in the art of the technical field to which the present invention pertains.

Figure 9:
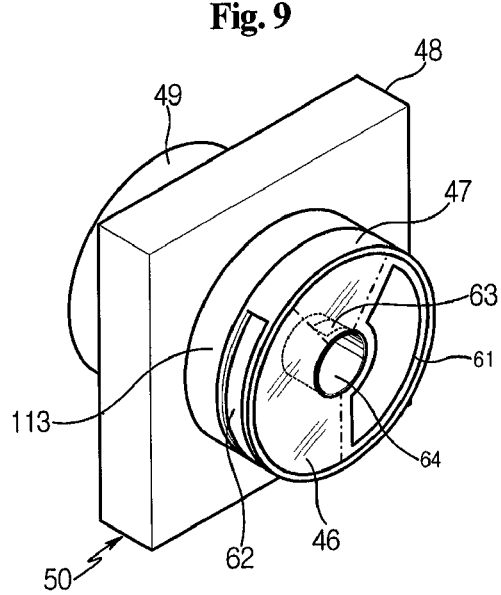
FIG. 9 is a view showing a harmful material treatment system, which is configured to regenerate thermal energy by using a distribution plate, according to another embodiment of the present invention.

While, FIG. 9 is a conceptual view showing a system using distribution plates according to the present invention, in which distribution plates 47, 49 are arranged for converting the flow path at the front portion and the back portion thereof to produce an effect identical with that of the rotary-type rotor without using the rotary-type rotor separately.

When the rotary-type rotor is used, it is possible to reduce the damage and wear of the machine due to the load of the rotor, and to change the numbers of revolution to thereby better improve the heat recovery percentage. Furthermore, an air inducing conduit 113, and a plurality of opening portions or conduits 61, 62, 63, and 64 can be designed to define the flow passage between the heat exchange medium portion (represented by numeral 48 for denoting the heat exchange medium and the casing integrally) and the distribution plates 47, 49. The conduits comprise an inflow opening 62, an exhaust opening 61, a desorption opening 63 and a desorption conduit 64.

It is possible to form the shape of the air inflow conduit 113 to be tapering, so that a portion joining with the heat exchange medium 48 becomes large and a portion joining with the distribution plates 47, 49 becomes small to thereby reduce the diameter of the distribution plates 47, 49. Also, it is possible to reduce the size of the rotating distribution plates to thereby reduce the power expense relative to the gas leakage and the driving.

Figure 10:
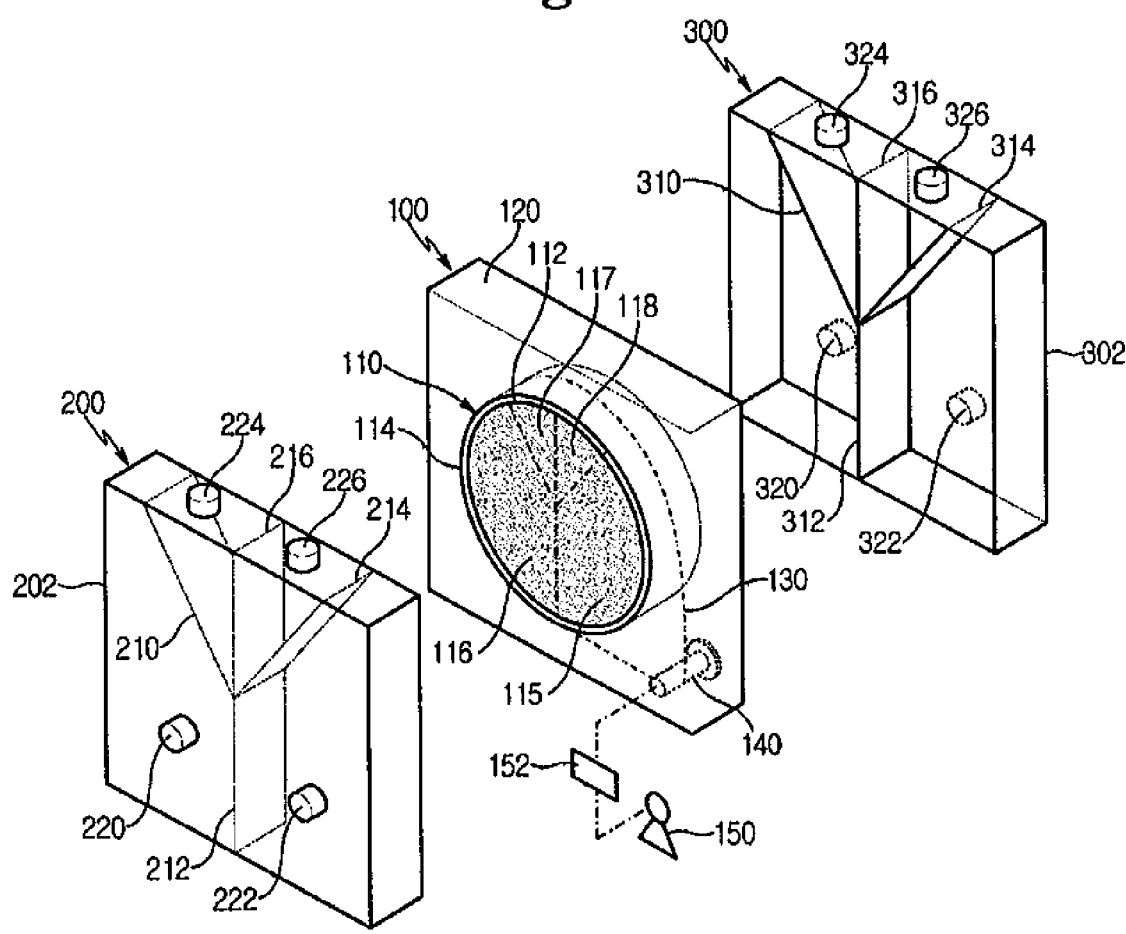
FIG. 10 is an exploded perspective view showing a harmful material treatment system, which is configured to regenerate the thermal energy, according to an embodiment of the present invention in detail.

FIG. 10 is an exploded perspective view showing an example of the harmful material treatment system using the rotary-type rotor of the present invention.

Referring to FIG. 10, the treating system comprises substantially an inside conduit portion 200, a rotary-type rotor 100, and an outside conduit portion 300.

As for the rotary-type rotor 100, the rotary-type rotors as described above can be employed. As shown in the drawings, the rotary-type rotor 110 is comprised of a heat exchange medium 112 divided into a plurality of regions 115, 116, 117, and 118, and a receiving portion 120, and is rotated by driving means such as a motor 150, a speed-reduction gear 152, and a driving shaft 140. The rotation shaft of the rotary-type rotor 110 has not been shown. In the present system, the driving means, the speed-reduction gear 152, and the driving shaft 140 can be mounted at the inside of the casing 120.

The inside conduit portion 200 comprises separation plates 210, 212, 214, 216 for separating several inlet and outlet flow passages and conduits 220, 222, 224, and 226 added to respective flow passages of the regions divided by the separation plates.

The inside air flowed in through the inlet conduit 220 of the inside conduit portion progresses through the exhaust region 116 of the rotary-type rotor to be exhausted to the outside through the outlet conduit 320. In this instance, the adsorption and thermal energy storage operation of the harmful material is produced in the exhaust region 116. The exhaust region 116, which has performed the operation of the adsorption and thermal energy storage is rotated to the desorption region by means of the rotation of the rotor, and the desorption operation can be produced by the air flowed in from the inlet conduit 324 for the desorption air. The desorbed air is exhausted to the outside through the outlet conduit 324 for the desorption air. In this instance, the inlet air for the desorption can be heated by means of heating means such as a burner, and the like for facilitating the desorption.

Thus, when the inlet air is to be heated, it is preferable that a cooling region is formed in the heat exchange medium, as shown in the drawing. This is because, if the heat exchange medium is at excessively high temperature, the adsorption operation cannot be performed easily when it returns to the exhaust region again.

The detached heat exchange medium 112 is rotated to progress into the cooling region 118, and is cooled by the cooling air flowed in from a cooling air inlet opening 326. The cooled air is exhausted through the cooling air outlet conduit 226. Since the cooling air is at higher temperature relative to the outside air, it is possible to reduce the energy for heating the air flowing into the desorption air inlet conduit 224 by forming a flow passage between the cooling air outlet conduit 226 and the desorption air inlet conduit 224 and recycling it.

Then, when the heat exchange medium progresses into the suction region 115 by the rotation of the rotor, the outside air is flowed in through an outside air inlet opening 322 to pass through the suction region 115. In this instance, it flows into the inside of the rotor through the outside air outlet opening 222 after recovering the thermal energy stored in the heat exchange medium in the suction region 115.

In the embodiments of the present invention as described above, it is preferable to perform sealing at the boundary of the respective region of the exhaust region, the suction region, the desorption region, and the cooling region, so that the air is not to be mixed. It is preferable to use heat resistant material such as silicon rubber, teflon, and the like as proper sealing material. The sealing can be accomplished by providing sealing material at proper position of the distribution plates between the distribution plates and the heat exchange medium, or at the separation plate between the separation plate and the heat exchange medium.

While the present invention has been described with reference to the preferred embodiments, the present invention can be performed in various forms without departing from the spirit or principal features. Accordingly, the above embodiment is only illustrative in all respects, and should not be construed to limit the present invention. The scope of the present invention is represented by the appended claims, and it is not restricted by the detailed description of the specification. As a result, all modifications and changes pertained to the equivalents of the appended claims are belonged to the scope of the present invention.

INDUSTRIAL APPLICABILITY

Accordingly, the harmful material treatment system of the present invention can be used advantageously as facilities for improving the quality of the indoor air and treating the harmful process gas, and as the air conditioning device for improving the work environment.

The invention claimed is:

1. A harmful material treatment system, which is configured to regenerate thermal energy, comprising:
a rotary-type rotor with a heat exchange medium having functions of adsorbing the harmful material and storing the thermal energy concurrently, and a heat exchange medium-receiving portion for supporting and rotating the heat exchange medium, the heat exchange medium being divided into at least three regions, comprising a suction region for adsorbing the harmful material in the air to be sucked through the suction region, an exhaust region for adsorbing the harmful material in the air to be exhausted through the exhaust region, and a concentration and desorption region disposed between the suction region and the exhaust region for concentrating and removing the harmful material; and
driving means for rotating the rotary-type rotor, wherein the thermal energy, stored to the heat exchange medium in the exhaust region, is recovered to the air to be sucked in the suction region.

2. The harmful material treatment system according to claim 1, further comprising heating means for heating desorbing air flowing into the concentration and desorption region.

3. The harmful material treatment system according to claim 1, wherein the desorption of the harmful material in the concentration and desorption region of the rotary-type rotor is carried out by the radiation of ultra-violet rays.

4. The harmful material treatment system according to claim 1, wherein the desorption of harmful material in the concentration and desorption region of the rotary-type rotor is carried out by a sound wave.

5. The harmful material treatment system according to claim 1, wherein the desorption of harmful material in the concentration and desorption region of the rotary-type rotor is carried out by pressure reduced air.

6. The harmful material treatment system according to claim 2, wherein the rotary-type rotor further comprises a cooling region disposed between the concentration and desorption region and the suction region for cooling the heat exchange medium heated for desorption.

7. The harmful material treatment system according to claim 6, wherein the outflow air exhausted from the cooling region flows into the concentration and desorption region.

8. The harmful material treatment system according to claim 1, wherein the heat exchange medium uses a material selected from the group consisting of cordierite having a high thermal energy storage function, bending-type ceramic sheet, alumina, silica, polymer resin, aluminum, stainless, asbestos, and natural fiber, or a composite material made by combining such materials, as a thermal energy storage material, and is made by performing coating with a material selected from the group consisting of zeolite having adsorption function, activated charcoal, activated carbon fiber, alumina, silica, photo-catalyst, and low-temperature oxidation catalyst, or a composite material made by combining such materials on the thermal energy storage material, or is made by mixing such materials.

9. The harmful material treatment system according to claim 7, wherein the heat exchange medium is made of at least one material selected from the group consisting of zeolite with a high thermal energy storage property, activated charcoal, activated carbon fiber, alumina, and silica.

10. The harmful material treatment system according to claim 1, wherein the heat exchange medium is used after being formed into a low-pressure loss type structure of honeycomb type or bending-type, into a net shape structure, or into a predetermined shape, and then filled.

11. The harmful material treatment system according to claim 1, wherein the heat exchange medium comprises a thermal energy storage layer and an adsorption layer.

12. The harmful material treatment system according to claim 11, wherein the thermal energy storage layer is made of a material selected from the group consisting of cordierite having a high thermal energy storing function, bending-type ceramic sheet, alumina, silica, polymer resin, aluminum, stainless, asbestos, and natural fiber, or a composite material made by combining such materials, and the adsorption layer is made of a material selected from the group consisting of zeolite, activated charcoal, activated carbon fiber, alumina, silica, photo-catalyst, and low-temperature oxidation catalyst, or a composite material made by combining such materials.

13. The harmful material treatment system according to claim 11, wherein the thermal energy storage layer is used after being formed into a low-pressure loss type structure of honeycomb type or bending-type, into a net shape structure, or into a predetermined shape, and then filled.

14. The harmful material treatment system according to claim 1, further comprising an inside conduit portion having a plurality of separation plates closely contacting with the heat exchange medium at one side of the heat exchange medium, and forming separate flow passages at the heat exchange medium to correspond to the at least three regions, and a plurality of conduits for allowing the inflow and outflow of the air through the flow passages formed by the separation plates; and an outside conduit portion having a plurality of separation plates closely contacting with the heat exchange medium at the other side of the heat exchange medium, and forming separate flow passages to fluidically communicate with the inside conduit portion to correspond to the at least three regions of the heat exchange medium, and a plurality of conduits for allowing the inflow and outflow of the air through the formed flow passages.

15. The harmful material treatment system according to claim 1, further comprising:

rotatable distribution plates with a plurality of openings mounted respectively at the heat exchange medium portion, so that respective regions of the heat exchange medium defines separate flow passages to allow the inflow of the outside air and outflow of the inside air.

\* \* \* \* \*